(12) United States Patent
Ishida et al.

(10) Patent No.: US 6,312,159 B1
(45) Date of Patent: Nov. 6, 2001

(54) BEARING METAL POSITIONING STRUCTURE IN A SPLIT CONNECTING ROD

(75) Inventors: Masao Ishida; Toyotaka Kinoshita; Tadashi Kato; Tetsuya Tosaka, all of Saitama (JP)

(73) Assignee: Honda Giken Kogyo Kabushiki Kaisha

( * ) Notice: Subject to any disclaimer, the term of this patent is extended or adjusted under 35 U.S.C. 154(b) by 0 days.

(21) Appl. No.: 09/464,083

(22) Filed: Dec. 16, 1999

(30) Foreign Application Priority Data

Dec. 16, 1998 (JP) .................................................. 10-357751

(51) Int. Cl.$^7$ ........................................................ F16C 9/02
(52) U.S. Cl. ........................................... 384/294; 384/430
(58) Field of Search ................................... 384/503, 288, 384/294, 429–434

(56) References Cited

U.S. PATENT DOCUMENTS

| | | | |
|---|---|---|---|
| 3,576,353 | * | 4/1971 | Barker et al. ........................ 384/430 |
| 4,114,961 | * | 9/1978 | Pithie ................................... 384/430 |
| 4,423,667 | * | 1/1984 | Hayashi ............................ 384/433 X |
| 4,684,267 | * | 8/1987 | Fetouh ................................. 384/294 |
| 5,551,782 | * | 9/1996 | Arnhold et al. ..................... 384/294 |

FOREIGN PATENT DOCUMENTS

| | | | |
|---|---|---|---|
| 3618742-A1 | * | 12/1987 | (DE) ................................. 384/430 |
| 342800-A2 | * | 11/1989 | (EP) ................................. 384/430 |
| 61-262219A | | 11/1986 | (JP) . |
| 2-19328 B2 | | 1/1987 | (JP) . |

* cited by examiner

*Primary Examiner*—Thomas R. Hannon
(74) *Attorney, Agent, or Firm*—Birch, Stewart, Kolasch & Birch, LLP

(57) ABSTRACT

A bearing metal positioning structure in a split connecting rod with lowered production cost and improved accuracy in positioning the bearing metal. The bearing metal positioning structure includes a pair of bearing metal halves, each of which is formed into a circular arc shape traversing 180 degrees. The pair of bearing metal halves have flat mating planes which abut one another to form a cylindrical bearing metal. A pair of projections are disposed on each of the mating planes at both axial ends so as to project radially outwardly therefrom. Locking grooves to be engaged with the pairs of projections, and additional locking grooves, are integrally die-formed simultaneously with the production of a die-formed body of the split connecting rod.

14 Claims, 8 Drawing Sheets

BEARING METAL POSITIONING STRUCTURE IN A SPLIT CONNECTING ROD

BACKGROUND OF THE INVENTION

1. Field of the Invention

The present invention relates to a bearing metal positioning structure in a split connecting rod, particularly to a bearing metal positioning structure with low production costs and improved accuracy of positioning the bearing metal.

2. Background Art

In general, a bearing metal composed of a pair of bearing metal halves, each of which is formed into a 180 circular-arc shape in cross-section, is inserted in a large-diameter end portion of a split connecting rod for an internal combustion engine. An oil film is formed between the bearing metal and a crank pin to lubricate between the connecting rod and the crank pin.

The pair of bearing metal halves are mounted between a rod side upper half and a cap side lower half of the large-diameter end portion while being positioned so as not to move in the peripheral direction and in the axial direction.

To effect the positioning of the bearing metal halves, in general, a projection is formed at one of both the peripheral ends of each bearing metal half formed into a 180 circular-arc in cross-section. As shown in FIG. 11 of this application, locking grooves 05b and 05a are formed in the inner peripheral surfaces, on the mating plane sides, of upper and lower halves of the large-diameter end portion of the split connecting rod, respectively. The positioning of the bearing metal halves is performed by engaging the projections in the locking grooves 05b and 05a (see Japanese Patent Publication No. Hei 2-19328, and Japanese Patent Laid-open No. Sho 61262219).

FIG. 11 is a schematic partial view, seen from the inner peripheral surface 01d side, of large-diameter end portion 01a of a split connecting rod. In FIG. 11, reference numeral 02 designates an upper half of the large-diameter end portion, and 03 is a lower half (cap side half) of the large-diameter end portion. The inner peripheral surface 01d forms a bearing hole for rotatably supporting a crank pin.

In the above method, however, because the halves 02 and 03 of the large-diameter end portion 01a of the split connecting rod are separately machined to form the locking grooves 05b and 05a in the inner peripheral surfaces, on the mating plane sides, of the upper and lower halves 02 and 03, production costs are raised.

When the split connecting rod is configured as the breaking-split connecting rod, an integrally die-formed body is broken along a breaking plane C. The die-formed body is formed into the rod side half containing the upper half 02 of the large-diameter end portion 1a, and a cap side half being the same as the lower half 03 of the large diameter end portion 1a.

The rod side half and the cap side half are assembled into one body, and the locking grooves are mechanically finished in the assembled state. In this case, only the paired locking grooves opposed and communicated to each other with the breaking plane C can be mechanically finished. The locking grooves 05b and 05a located on the opposed sides with respect to the breaking plane C at different axial positions cannot be mechanically finished.

To mechanically finish the locking grooves 05b and 05a, the locking groove 05b of the rod side half and the locking groove 05a of the cap side half must be separately, mechanically finished before assembly of the rod side half and the cap side half into one body. This likely results in damage to the breaking plane C during machining.

Further, if the split connecting rod is configured as a breaking-split type connecting rod, the breaking plane C of an integrally die-formed body becomes bearing metal locking planes 017b and 017a in the circumferential direction of the locking grooves 05b and 05a, which degrades the accuracy of positioning the bearing metal.

An object of the present invention is to solve the above-described problems of the related art bearing metal positioning structure in a split connecting rod, and to provide a bearing metal positioning structure in a split connecting rod with reduced production costs by eliminating the necessity of machining locking grooves on the split connecting rod side, and improving the accuracy of positioning the bearing metal.

Another object of the present invention is to provide a bearing metal positioning structure in a split connecting rod which is less likely to involve error in assembling the bearing metal in the split connecting rod.

SUMMARY OF THE INVENTION

The present invention achieves the above objects and other advantages not contemplated by the conventional art. The present invention is addressed to a bearing metal positioning structure in a split connecting rod for mounting a bearing metal in a large-diameter end portion of the split type connecting rod. The bearing metal is composed of a pair of bearing metal halves, each of which is formed into a 180 degree circular-arc shape. The pair of bearing metal halves have flat planes (mating planes) which abut to form a cylindrical bearing metal.

A pair of projections are disposed on each of the mating planes at both axial ends which project radially outwardly therefrom, and locking grooves to be engaged with the pairs of projections are integrally die-formed simultaneously with the production of a die-formed body of the split connecting rod.

As a result of this configuration, by the engagements between pairs of the projections and the locking grooves, it is possible to restrict the movement of the bearing metal in the peripheral direction and the axial direction, and to accurately perform the positioning of the bearing metal halves. Further, it is possible to eliminate the necessity of machining works for forming the locking grooves, which lowers production costs.

In addition, the locking grooves are formed at both axial ends of a large-diameter end portion of the split connecting rod.

Since the locking grooves are each formed into a shape in which the axial end of the locking groove is opened, they can be easily die-formed upon the production of a die-formed body of the split connecting rod. Further, by engagement of pairs of the projections of the bearing metal halves in these locking grooves, it is possible to restrict the axial movement of the bearing metal halves and hence to restrict the axial movement of the bearing metal.

The split connecting rod is configured as a breaking-split type connecting rod, and the locking grooves are integrally-die-formed in such a manner as to be opened to a breaking plane or penetrated by the breaking plane.

As a result, starting points of breaking can be set at these locking grooves, to thereby facilitate the breaking work.

When a pair of locking grooves are formed on the rod side upper half and the cap side lower half at both the axial ends of the large-diameter end portion of the breaking split-type connecting rod in such a manner as to be opposed and communicated to each other with respect to the breaking plane, a pair of locking grooves can be integrally die-formed as one large locking groove simultaneously with the production of a die-formed body of the breaking split type connecting rod. Consequently, the locking grooves can be easily die-formed.

Since the locking grooves are integrally die-formed simultaneously with the production of a die-formed body of the breaking-split type connecting rod, the locking portions of the bearing metal halves in the peripheral direction are determined at specific positions of the integrally die-formed body, and are not affected by the breaking manner for breaking the integrally die-formed body. It is therefore possible to improve the accuracy of positioning of the bearing metal. Also, with this configuration, since the limitations on the breaking position of the integrally die-formed body can be relaxed, breaking work is simplified.

A recessed groove having a notch portion functioning as a starting point of breaking is formed in the inner peripheral surface of the large-diameter end portion of the breaking split-type connecting rod and extends along the breaking plane.

As a result, when an integrally die-formed body of the breaking-split type connecting rod is broken, the starting point of the breaking plane (split plane) can be fixed at the notch portion of the recessed groove. It is therefore possible to more easily and accurately break the integrally die-formed body.

Since the recessed groove serves as the chamfers of the mating planes, it is possible to prevent damage to the back surfaces of the bearing metal halves.

With the presence of the recessed groove, thinned land portions do not remain at the peripheral portions near the locking grooves. As a result, when the bearing metal halves are mounted in the large-diameter end portion of the breaking split-type connecting rod by engaging the projections of the bearing metal halves in the above locking grooves, it is possible to prevent chipping in the peripheral portions near the locking grooves.

The pair of projections are formed on two mating plane portions of the mating plane located at both peripheral ends of each of the bearing metal halves, respectively. As a result, by the engagements between pairs of the projections and the corresponding locking grooves, it is possible to equalize the distribution of wear amounts of the bearing metal halves in the peripheral direction, and hence to improve the durability of the bearing metal halves.

An oil passage opened to the inner peripheral surface of the large-diameter end portion is formed in the upper half of the large-diameter end portion of the split connecting rod at a position separated from a connection portion between the large-diameter end portion, and a rod portion which connects the large-diameter end portion to a small-diameter end portion.

A first oil hole is formed in the peripheral wall of one of the bearing metal halves at a position corresponding to the opening of the oil passage. This bearing metal half is mounted in the lower half of the large-diameter end portion. A second oil hole is formed in the peripheral wall of the other of the bearing metal halves, which is mounted on the lower half of the large-diameter end portion of the split connecting rod, at a position facing the first oil hole, with the mating planes of the bearing metal halves put therebetween.

A further projection is formed on one mating plane portion, on the side where the first or second oil hole is formed, of the two mating plane portions located at both the peripheral ends of each of the bearing metal halves. The projection is formed at an axial end at which a projection has not yet been formed so as to radially outwardly project therefrom. A locking groove to be engaged with the further projection is integrally die-formed simultaneously with the production of a die-formed body of the split connecting rod.

Because each bearing metal half has, at both of the peripheral ends, the mating plane portion having one projection and the mating plane portion having two projections, it is easy for an operator to recognize whether the mating plane, on the side where the oil hole is formed, of the bearing metal half is located on the right side or left side. As a result, the bearing metal halves can be mounted in the upper half and the lower half of the large-diameter end portion of the split connecting rod without assembling error, by allowing each of the oil holes formed on the peripheral walls of the bearing metal halves to be aligned with the oil passage formed in the upper half of the large-diameter end portion of the split connecting rod.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3(*b*) is a bottom view of the upper bearing metal half shown in FIG. 3(*a*);

FIG. 4(*b*) is a bottom view of the lower bearing metal half of FIG. 4(*a*);

DETAILED DESCRIPTION OF THE PREFERRED EMBODIMENTS

Figure 1:
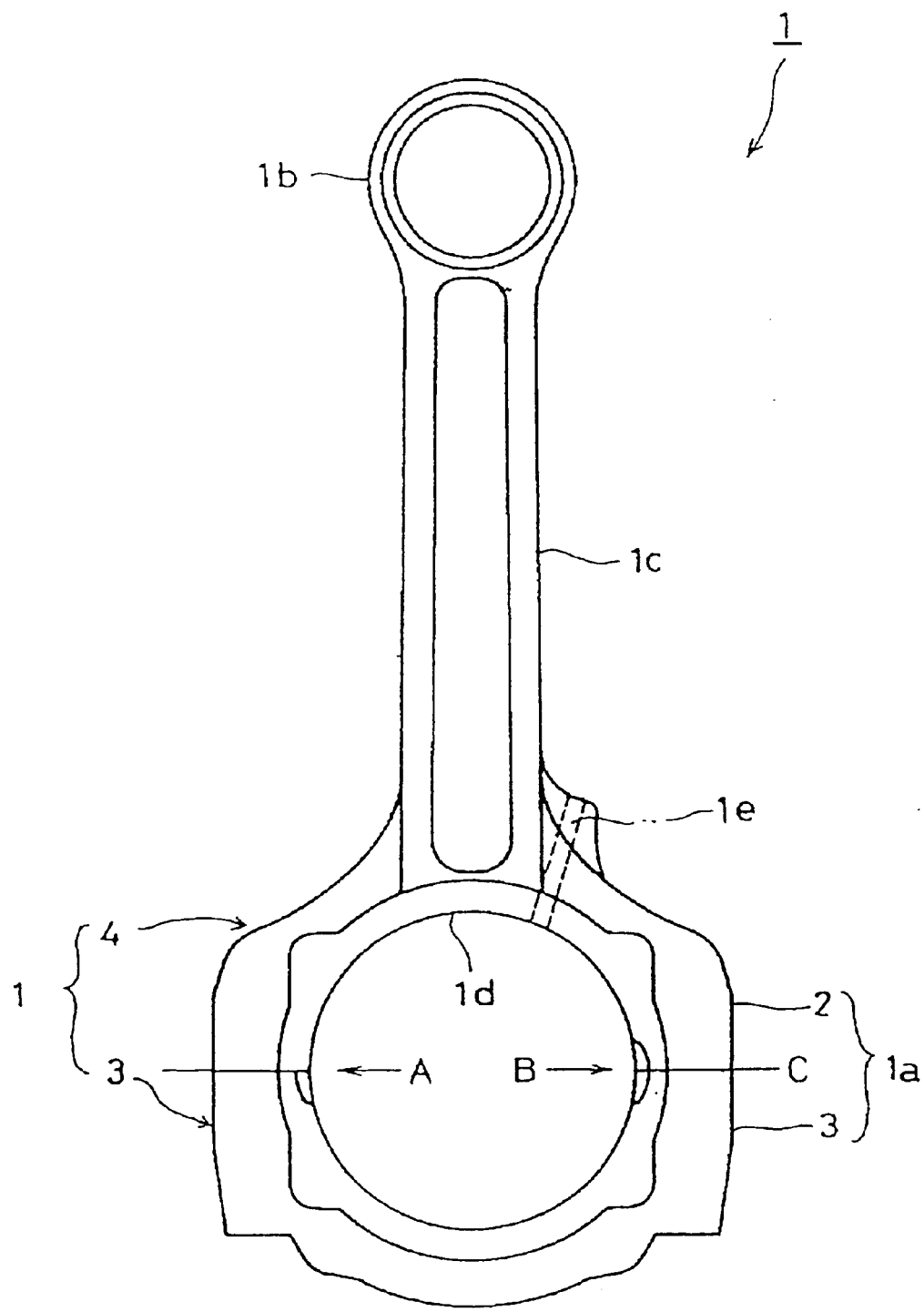
FIG. 1 is a front view of a split connecting rod having a bearing metal positioning structure according to a first embodiment of the present invention.

FIG. 1 is a front view of a split connecting rod to which a bearing metal positioning structure according to the first embodiment of the invention is applied. Referring to FIG. 1, the split connecting rod 1 includes a large-diameter end portion 1a by way of which a crank pin of a crank shaft (not shown) is supported via a bearing metal. The split connecting rod 1 also includes a small-diameter end portion 1b by means of which a piston pin of a piston (not shown) is supported via a bearing metal, and a rod portion (stem portion) 1c for connecting the large-diameter end portion 1a to the small-diameter end portion 1b.

The split connecting rod 1 is split along a split plane C into a rod side half 4 and a cap side half 3. The split plane C passes through the center of a crank pin supporting bearing hole 1d of the large-diameter end portion 1a, and is perpendicular to the center line of the split connecting rod 1. The rod side half 4 has an upper half (rod side upper half) of the large-diameter end portion 1a, the small-diameter end portion 1b, and the rod portion 1c, which are integral with one another. In production of the split connecting rod 1, both the halves 4 and 3 are assembled into one body. The cap side half 3 serves as the lower half (cap side lower half) 3 of the large-diameter end portion 1a.

The rod side half 4 and the cap side half 3 may be produced as an integrally die-formed body, which is split into two by parts breaking. The halves may also be formed by producing two die-formed bodies as halves 4 and 3. In the first embodiment, the halves 4 and 3 are obtained by splitting an integrally die-formed body. Accordingly, the split plane C is equivalent to the breaking plane formed by breaking.

In the case of producing two die-formed bodies as the halves 4 and 3, locking grooves are integrally die-formed. In this case, the mating planes of the die-formed bodies of the halves 4 and 3 are mechanically finished. The die-formed bodies are assembled into one body with the mating planes mated to each other, and the inner peripheral surface the large-diameter end portion 1a of the assembled body is mechanically finished, to form the bearing hole 1d. A bearing metal 10 (see FIG. 2) is mounted in the bearing hole 1d.

In the case of producing an integrally die-formed body and splitting it into the halves 4 and 3 by breaking, locking grooves are integrally die-formed. In this case, the integrally die-formed body is split into the halves 4 and 3. The two halves are then assembled into one body, and the inner peripheral surface of a portion, equivalent to the large-diameter end portion 1a, of the assembled body is mechanically finished, to form the bearing hole 1d.

A lubricating oil passage 1e opened to the inner peripheral surface of the large-diameter end portion 1a is formed in the upper half 2 of the large-diameter end portion 1a. The oil passage 1e is formed at a position separated from a connection portion between the large-diameter end portion 1a and the rod portion 1c.

Figure 2:
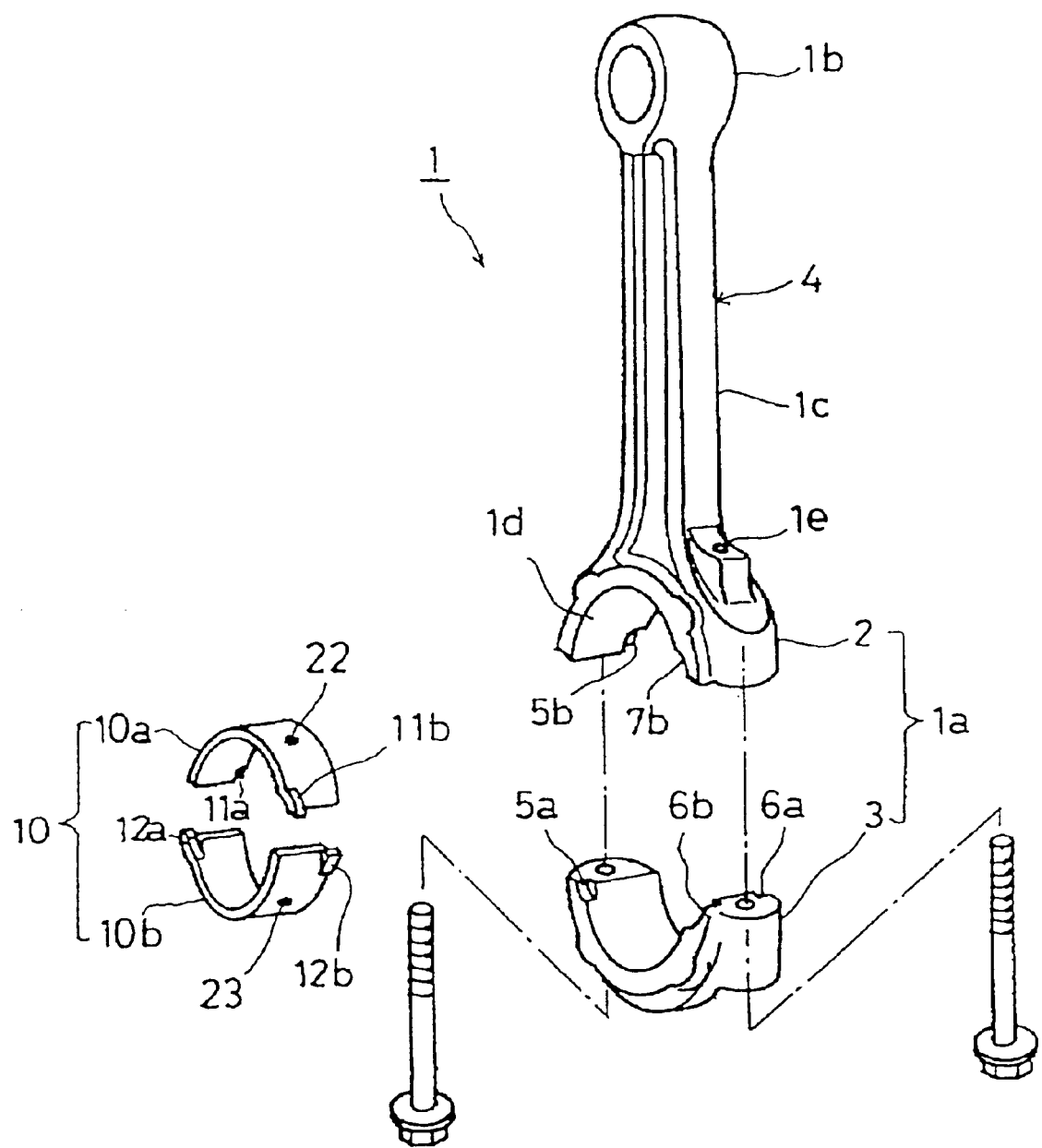
FIG. 2 is an exploded perspective view of the split connecting rod shown in FIG. 1, and a bearing metal to be mounted in the large-diameter end portion thereof.

FIG. 2 is an exploded perspective view showing the split connecting rod of FIG. 1, and a bearing metal mounted in the large-diameter end portion of the split connecting rod. As shown in FIG. 2, the bearing metal 10 is composed of a pair of an upper bearing metal half 10a and a lower bearing metal half 10b, each of which is formed into a 180 circular-arc shape in cross-section. These bearing metal halves 10a and 10b are assembled into a cylindrical body with mating planes 13 and 14 of the bearing halves 10 and 10b mated to one another.

Figure 3A:
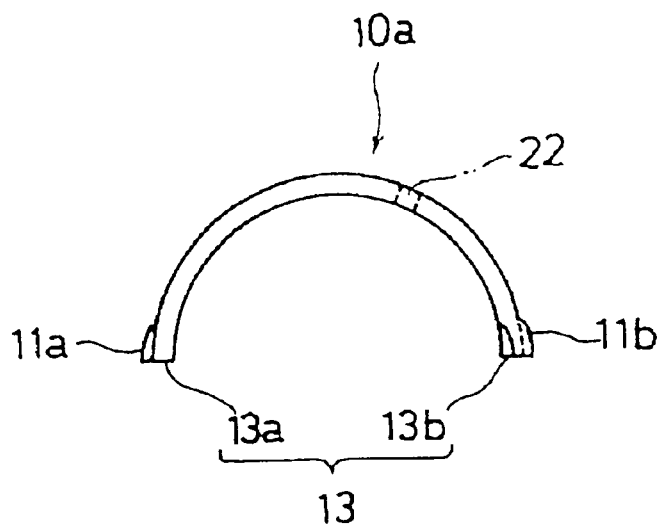
FIG. 3(*a*) is a side view of an upper bearing metal half to be mounted in the large-diameter end portion of the split connecting rod shown in FIG. 1.
Figure 3B:
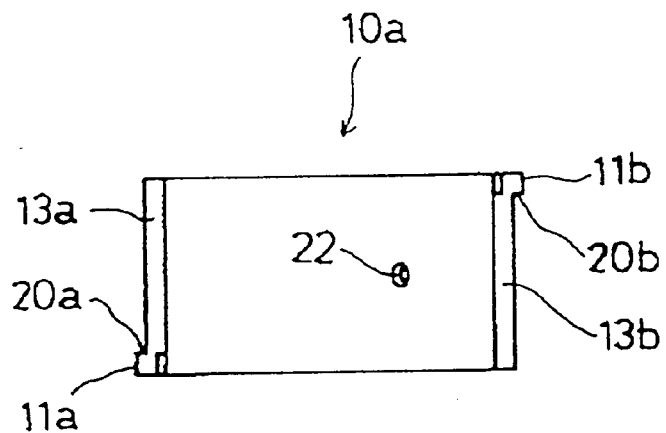

FIGS. 3(a) and 3(b) are views showing an upper side bearing metal mounted in the large-diameter end portion of the split connecting rod shown in FIG. 1, wherein FIG. 3(a) is a side view and FIG. 3(b) is a bottom view. As shown in FIGS. 3(a) and 3(b), a pair of projections 11a and 1b are formed, by pressing, on the mating plane 13 of the upper bearing metal half 10a. The projections 11a and 11b are formed at both ends in the axial direction in such a manner as to project radially outward.

Figure 4B:
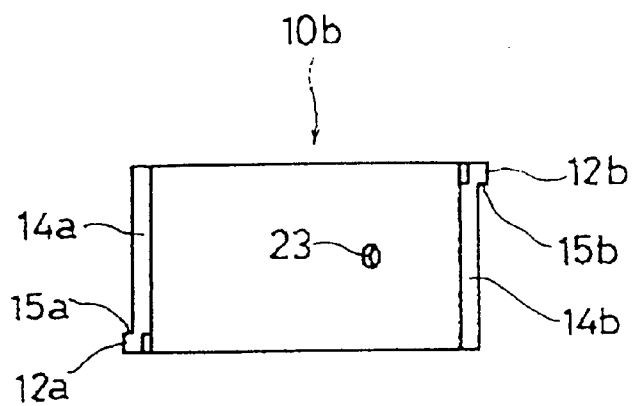
FIG. 4(*a*) is a side view of a lower bearing metal half to be mounted in the large-diameter end portion of the split connecting rod shown in FIG. 1.
Figure 4A:
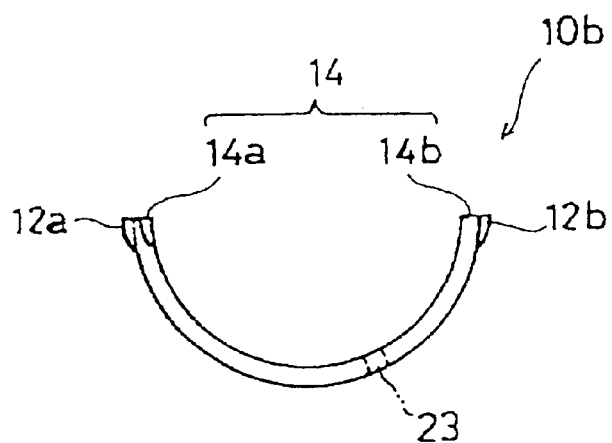

FIGS. 4(a) and 4(b) are views showing a lower side bearing metal, wherein FIG. 4(a) is a side view and FIG. 4(b) is a plan view. Similarly to FIGS. 3(a) and 3(b), as shown in FIGS. 4(a) and 4(b), a pair of projections 12a and 12b are formed, by pressing, on the mating plane 14 of the lower bearing metal half 10b at both ends in the axial direction so as to project radially outward.

The mating plane 13 of the upper bearing metal half 10a is composed of two mating plane portions 13a and 13b at both the peripheral ends of the upper bearing metal half 10a. Similarly, the mating plane 14 of the lower bearing metal half 10b is composed of two mating plane portions 14a and 14b at both the peripheral ends of the lower bearing metal half 10b.

The projection 11a is formed on the mating plane portion 13a at one end in the axial direction of the upper bearing metal half 10a, and the projection 11b is formed on the mating plane 13b at the other end in the axial direction of the upper bearing metal half 10a. Similarly, the projection 12a is formed on the mating plane portion 14a at one end in the axial direction of the lower bearing metal half 10b, and the projection 12b is formed on the mating plane 14b at the other end in the axial direction of the lower bearing metal half 10b.

An oil hole 22 is formed in the peripheral wall of the upper bearing metal half 10a at a position corresponding to the opening of the oil passage 1e formed in the upper half 2 of the large-diameter end portion 1a of the split connecting rod 1. An oil hole 23 is formed in the peripheral wall of the lower bearing metal half 10b at a position facing to that of the oil hole 22 with the mating planes of the bearing metal halves 10a and 10b located between both the oil holes 22 and 23.

The upper and lower bearing metal halves 10a and 10b have the same structure. In other words, by turning over a metal half used as the upper bearing metal half 10a, the metal half can be also used as the lower bearing metal half 10b. Accordingly, only one type of bearing metal half need be produced, which lowers production costs.

These upper and lower bearing metal halves 10a and 10b are respectively mounted in the upper and lower halves 2 and 3 of the large-diameter end portion 1a of the breaking-split type connecting rod 1 using the procedure described below.

Figure 5:
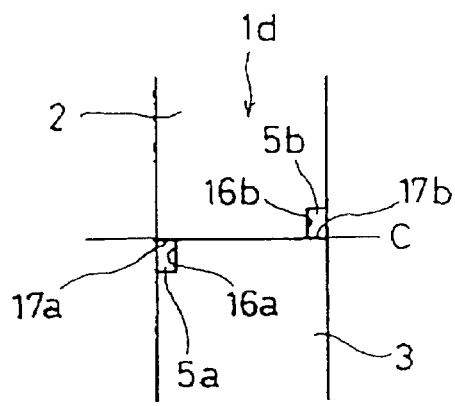
FIG. 5 is a schematic front view, seen from the direction of A in FIG. 1, of the inner peripheral surface of the large-diameter end portion of the split connecting rod.

FIG. 5 is a schematic front view, seen from the direction A in FIG. 1, showing the inner peripheral surface of a large-diameter end portion of the split connecting rod. As shown in FIG. 5, a pair of locking grooves 5a and 5b are formed in the bearing hole 1d portion. Specifically, the grooves are formed on the inner peripheral surface portion of the large-diameter end portion 1a of the breaking-split type connecting rod 1, on the lower half 3 side and upper half 2 side respectively, with the breaking plane C therebetween, at opposite axial ends of the large-diameter end portion 1a.

Figure 6:
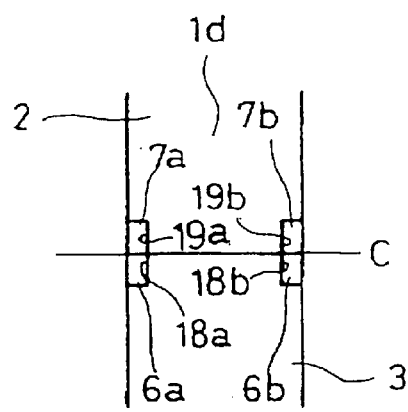
FIG. 6 is a schematic front view, seen from the direction of B in FIG. 1, of the inner peripheral surface of the large-diameter end portion of the split connecting rod.

FIG. 6 is a schematic front view, seen from the direction B in FIG. 1, showing the inner peripheral surface of the large-diameter end portion of the split connecting rod. As shown in FIG. 6, a pair of locking grooves 6a and 6b are respectively formed on the lower half 3 side (under the breaking plane C in FIG. 5) at both ends in the axial direction of the large-diameter end portion 1a, and a pair of locking grooves 7a and 7b are respectively formed on the upper half 2 side (above the breaking plane C in FIG. 5) at both ends in the axial direction of the large-diameter end portion 1a.

In producing a die-formed body of the breaking-split type connecting rod 1, the locking grooves 5a, 5b, 6a, 6b, 7a and 7b are integrally die-formed at one time in so as to be opened to the breaking plane C. The locking grooves 6a and 7a are opposed and communicated to each other across the breaking plane C, and similarly the locking grooves 6b and 7b are opposed and communicated to each other across the breaking plane C.

Accordingly, in producing a die-formed body of the breaking-split type connecting rod 1, each of the pairs of the locking grooves 6a and 7a and 6b and 7b are integrally die-formed at one time as one large groove crossing from the upper half 2 to the lower half 3 of the large-diameter end portion 1a.

When the upper and lower bearing metal halves 10a and 10b are mounted in the large-diameter end portion 1a, two pairs of the projections 11a and 11b and 12a and 12b respectively formed on the upper and lower bearing metal halves 10a and 10b are engaged in the corresponding four of the locking grooves 5a, 5b, 6a, 6b, 7a and 7b. This engagement restricts the movement of the upper and lower bearing metal halves 10a and 10b in the peripheral direction and in the axial direction.

In FIGS. 3(a) and 3(b) and 4(a) and 4(b), when the upper bearing metal half 10a is mounted in the upper half 2 of the large-diameter end portion 1a, the projection 11a of the upper bearing metal half 10a is engaged in the locking groove 5b of the upper half 2, and the projection 11b of the upper bearing metal 24 half 10a is engaged in the locking groove 7b of the upper half 2.

When the lower bearing metal half 10b is mounted in the lower half 3 of the large-diameter end portion 1a, the projection 12a of the lower bearing metal half 10b is engaged in the locking groove 5a of the lower half 3, and the projection 12b of the lower bearing metal half 10b is engaged in the locking groove 6a of the lower half 3.

In the case of mounting the lower bearing metal half 10b in the lower half 3, the engagement of the projection 12a in the locking groove 5a is as follows: a locking plane 15a of the projection 12a is engaged with a locking plane 16a of the locking groove 5a, and a ceiling plane (lower end plane of the mating plane portion 14a in FIG. 4(b)) of the projection 12a is engaged with a locking plane 17a of the locking groove 5a. In addition, the locking plane 17a lies on the mating plane of the upper half 2 at the breaking plane C.

The engagement of the projection 12b in the locking groove 6a is as follows: a locking plane 15b of the projection 12b is engaged with a locking plane 18a of the locking groove 6a. Since the locking groove 6a is adjacent to the locking groove 7a, there is no locking plane for positioning the lower bearing metal half 10b in the peripheral direction between these locking grooves 6a and 7a. There is also no locking plane between the locking grooves 6b and 7b.

In this way, by the engagement between the locking planes 15a and 16a, and the engagement between the locking planes 15b and 18a, the axial movement of the lower bearing metal half 10b is restricted. Further, by the engagement between the ceiling plane of the projection 12a and the locking plane 17a, the peripheral positioning of the lower bearing metal half 10b is accurately performed and simultaneously the peripheral movement of the lower bearing metal half 10b is restricted.

Similarly, when the upper bearing metal half 10a is mounted in the upper half 2 of the large-diameter end portion 1a, the axial movement of the upper bearing metal half 10a is restricted by engagement between the locking plane 20a of the projection 11a and the locking plane 16b of the locking groove 5b, and the engagement between the locking plane 20b of the projection 11b and the locking plane 19b of the locking groove 7b. Further, the peripheral positioning of the upper bearing metal half 10a is accurately performed and the peripheral movement of the upper bearing metal half 10a is restricted by the engagement between the bottom plane (lower end plane of the mating plane portion 13a in FIG. 3(b)) of the projection 11a and the locking plane 17b of the locking groove 5b. In addition, the locking plane 17b lies on the mating plane of the lower half 3 at the breaking plane C.

In this way, the upper and lower bearing metal halves 10a and 10b are respectively mounted in the upper and lower halves 2 and 3 of the large-diameter end portion 1a of the breaking-split type connecting rod 1, so that movement of the bearing metal halves in the peripheral and axial directions is restricted.

When the upper and lower bearing metal halves 10a and 10b are respectively mounted in the upper and lower halves 2 and 3, the locking groove 6b of the lower half 3 and the locking groove 7a of the lower half 2 shown in FIG. 5 are not used.

When the lower bearing metal half 10b in which the pair of the projections 12a and 12b are both formed on the mating plane portion 14b, and the upper bearing metal half 10a in which the pair of projections 11a and 11b are both formed on the mating plane portion 13b are mounted in the upper and lower halves 2 and 3, respectively, the locking grooves 6b and 7a are used. In this case, the locking groove 5a of the lower half 3 and the locking groove 5b of the upper half 2 are not used.

The above-described locking grooves 5a and 5b (see FIG. 5) and the locking grooves 6a, 6b, 7a and 7b (see FIG. 6) are integrally die-formed simultaneously with the production of a die-formed body of the breaking split type connecting rod 1. Since these grooves are formed at both the axial ends of the large-diameter end portion 1a of the breaking split type connecting rod 1 in such a manner as to be opened to the outside, they are easily die-formed.

A recessed groove 21 having a notch portion as a starting point of breaking is formed in the inner peripheral surface (bearing hole 1d) of the large-diameter end portion 1a of the breaking-split type connecting rod 1 so as to extend along the breaking plane C. One example of the recessed groove 21 is shown in FIG. 6.

Figure 7:
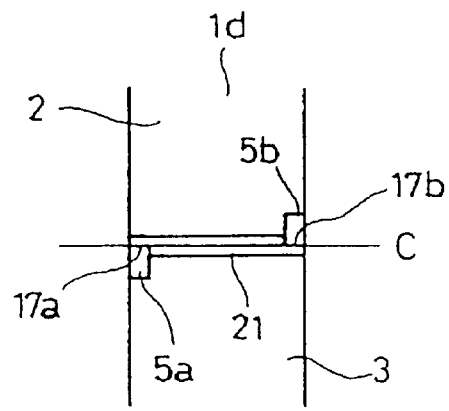
FIG. 7 is a view of a recessed groove formed in the inner peripheral surface of the large-diameter end portion.

FIG. 7 is a view, similar to FIG. 5, showing the inner peripheral surface of the split connecting rod in which a connection groove is formed. Referring to FIG. 7, the recessed groove 21 is formed along the breaking plane C so as to connect the locking grooves 5a and 5b to one another. The locking grooves 5a and 5b are respectively formed on the lower and upper sides with respect to the breaking plane C at both the axial ends of the large-diameter end portion 1a, and any locking grooves communicated to the locking grooves 5a and 5b are not formed on the opposed sides thereof with respect to the breaking plane C (see FIG. 5).

The recessed groove 21 is formed with a V-shaped cross-section, and the bottom of the V-shape forms the notch portion. The recessed groove 21 is integrally die-formed simultaneously with the production of a die-formed body of the breaking-split type connecting rod 1. The recessed groove 21 is located at a position so as to allow the large-diameter end portion 1a to be cut along the breaking plane C.

The notch portion of the recessed groove 21 acts as a starting point of the breaking plane C, so that it is possible to easily and accurately break the integrally die-formed body along the breaking plane C. The recessed groove 21 also serves as chamfers of the mating planes of the upper and lower halves 2 and 3 of the large-diameter end portion 1a.

Since the recessed groove 21 is formed in the bearing hole 1d, even if the position of the breaking plane C is somewhat offset, thinned land portions do not remain at the peripheral portions near the locking grooves 5a and 5b. As a result, upon the assembling steps of engaging the projections 12a and 11a of the upper and lower bearing metal halves 10b and 10a in the locking grooves 5a and 5b, it is possible to prevent chipping in the peripheral portions near the locking grooves 5a and 5b.

The advantage conveyed by the formation of the recessed groove 21 is particularly valuable when, as the locking grooves 5a and 5b shown in FIG. 5, a pair of locking grooves are formed at both the axial ends of the large-diameter end portion 1a in such a manner as to be opened to the breaking plane C, and opposed (with respect to the breaking plane C) locking grooves communicated to the above pair of the locking grooves are not formed.

When the upper and lower bearing metal halves 10a and 10b are mounted in the large-diameter end portion 1a, the mating plane 13 (13a, 13b) of the bearing metal half 10a and the mating plane 14 (14a, 14b) of the bearing metal half 10b are pressed to each other. Accordingly, it is possible to sufficiently ensure a crush relief between the bearing metal halves 10a and 10b and the crank pin rotatably supported by the bearing metal halves 10a and 10b. As a result, even if the upper and lower bearing metal halves 10a and 10b are extended in the axial direction of the connecting rod by a centrifugal force upon operating of an internal combustion engine, it is possible to sufficiently ensure a lubricating oil film between the crank pin and the bearing metal halves 10a and 10b.

The locking grooves 5a and 6a and the locking grooves 5b and 7b to be engaged with a pair of the projections 11a and 11b and a pair of the projections 12a and 12b respectively, and the locking grooves 6b and 7a not used in this embodiment, are integrally die-formed simultaneously with the production of a die-formed body of the breaking-split type connecting rod 1.

As a result, when the bearing metal halves 10a and 10b are mounted in the large-diameter end portion 1a of the split connecting rod 1, by the engagement between a pair of the projections 11a and 11b and the locking grooves 5a and 6a, and the engagement between a pair of the projections 12a and 12b and the locking grooves 5b and 7b, the movement of the bearing metal halves 10a and 10b in the peripheral direction and the axial direction is restricted and the positioning of the bearing metal halves 10a and 10b is accurately performed.

Further, since the locking grooves 5a, 5b, 6a, 6b, 7a, and 7b are integrally die-formed simultaneously with the production of a die-formed body of the split connecting rod 1, it is possible to eliminate the necessity of machining steps for forming the locking grooves, which reduces production costs.

Since the locking grooves 5a, 5b, 6a, 6b, 7a, and 7b are formed at both the axial ends of the large-diameter end portion 1a of the split connecting rod 1, they are each formed into the shape in which the axial end of the locking groove is opened. As a result, the locking grooves can be easily die-formed upon the production of a die-formed body of the split connecting rod 1.

In this embodiment, the split connecting rod 1 is configured as a breaking-split type connecting rod 1, and the locking grooves 5a, 5b, 6a, 6b, 7a, and 7b are integrally die-formed simultaneously with the production of a die-formed body of the breaking-split type connecting rod 1 so as to be opened to the breaking plane C, or at least penetrated by the breaking plane C.

As a result, starting points of breaking can be set at these locking grooves 5a, 5b, 6a, 6b, 7a, and 7b, to thereby facilitate the breaking work.

When locking grooves are formed on the rod side upper half 2 and the cap side lower half 3 at both the axial ends of the large-diameter end portion 1a of the breaking split-type connecting rod 1 so as to be opposed and to communicate with one another, the pair of locking grooves can be integrally die-formed as one large locking groove, simultaneously with the production of a die-formed body of the rod 1. Consequently, the locking grooves can be easily die-formed.

Since the locking grooves 5a and 5b (see FIG. 5) and the locking grooves 6a, 6b, 7a and 7b (see FIG. 6) are integrally die-formed simultaneously with the production of a die-formed body of the breaking-split type connecting rod 1, the locking portions of the bearing metal halves 10a and 10b in the peripheral direction are determined at specific positions of the integrally die-formed body, and are not affected by the manner of breaking of the integrally die-formed body. It is therefore possible to improve the accuracy of positioning the bearing metal 10 (bearing metal halves 10a and 10b). Also, in this configuration, since the restriction of the breaking position of the integrally die-formed body can be relaxed, it is possible to further facilitate the breaking work.

In this embodiment, the recessed groove 21 having the notch portion as a starting point of breaking is formed in the inner peripheral surface (bearing hole 1d) of the large-diameter end portion 1a so as to extend along the breaking plane.

As a result, when an integrally die-formed body of the breaking-split type connecting rod 1 is broken, the starting point of the breaking plane (split plane) C can be fixed at the notch portion of the recessed groove 21, so that it is possible to more easily and accurately break the integrally die-formed body.

Since the recessed groove 21 serves as the chamfers of the mating planes of the upper and lower halves 2 and 3, it is possible to prevent the occurrence of damage to the back surfaces of the bearing metal halves 10a and 10b.

Since the recessed groove 21 is formed in the bearing hole 1d, even if the position of the breaking plane C is somewhat offset, thinned land portions do not remain at the peripheral portions near a pair of locking grooves (such as locking grooves 5a and 5b) formed at both the axial ends of the large-diameter end portion 1a with any locking grooves communicated thereto not formed on the opposed sides with respect to the breaking plane C.

As a result, when the bearing metal halves 10a and 10b are mounted in the large-diameter end portion 1a of the breaking split-type connecting rod 1, by engaging the corresponding projections of the bearing metal halves 10a and 10b in the above locking grooves, it is possible to prevent chipping in the peripheral portions near the locking grooves.

Figure 8:
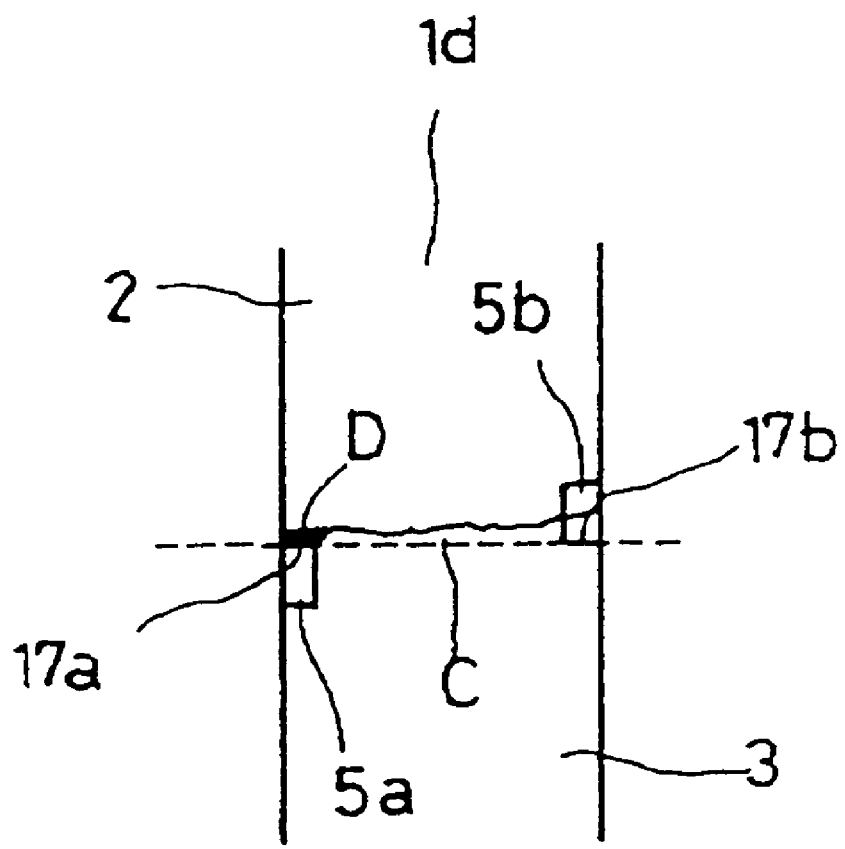
FIG. 8 is a view illustrating the difficulty caused when the recessed groove is not formed.
Figure 9A:
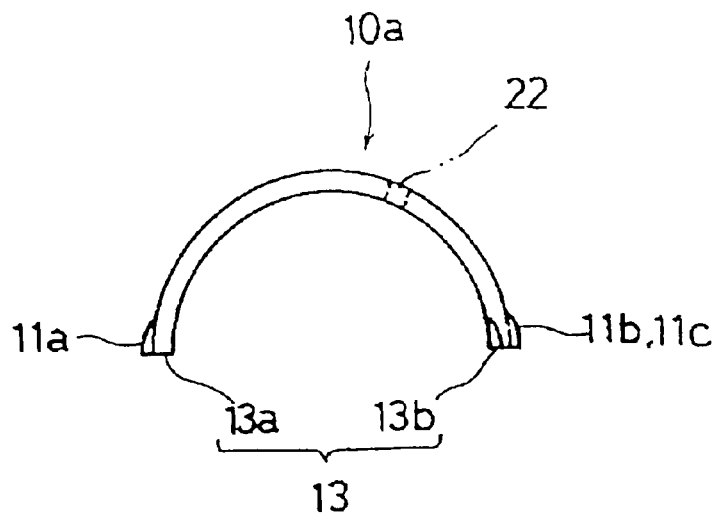
FIG. 9(*a*) is a side view of an upper bearing metal half according to a second embodiment of the present invention.
FIG. 9(b) is a bottom view of the upper bearing metal half of FIG. 9.
Figure 9B:
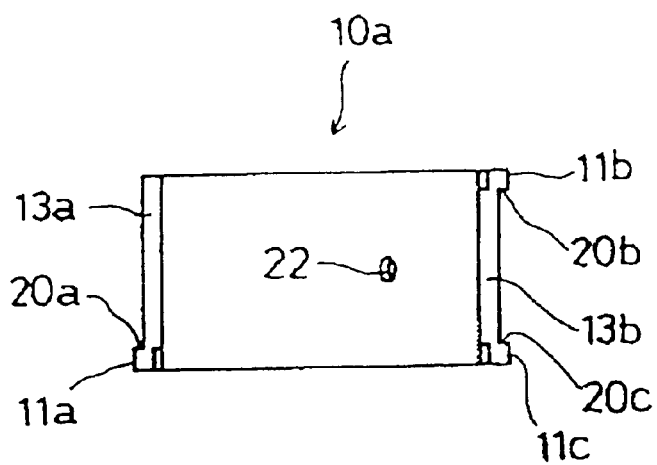

If the recessed groove 21 connecting the locking grooves 5a and 5b to one another is not formed, when the starting point of the breaking plane C is offset from the normal position shown by a chain line in FIG. 8, a thinned land portion D (shown by hatching) remains at a position near the upper side of the locking groove 5a, and can possibly chip.

Further, a pair of the projections 11a and 11b are formed, on the mating plane portions 13a and 13b located at both the peripheral ends of the upper bearing metal half 10a, at the axial ends opposed to each other; while a pair of the projections 12a and 12b are formed, on the mating plane portions 14a and 14b located at both the peripheral ends of the upper bearing metal half 10b, at the axial ends opposed to each other.

As a result, by the engagement between a pair of the projections 11a and 11b and the corresponding locking grooves, and the engagement between a pair of the projections 12a and 12b and the corresponding locking grooves, it is possible to equalize the distribution of wear of the bearing metal halves 10a and 10b in the peripheral direction, and hence to improve the durability of the bearing metal halves 10a and 10b.

A second embodiment of the invention will now be described with reference to FIGS. 9(a) and 9(b) and FIGS. 10(a) and 10(b). The mating plane portions 13a and 13b located at both the peripheral edges of the upper bearing metal half 10a, the mating plane portion 13b (on the side where the oil hole 22 is provided) has a further projection 11c at an axial end (the lower end in FIG. 9(b)). The projection 11c projects radially outwardly from the axial end. A locking projection is not formed at this location in the first embodiment of the invention.

Figure 10B:
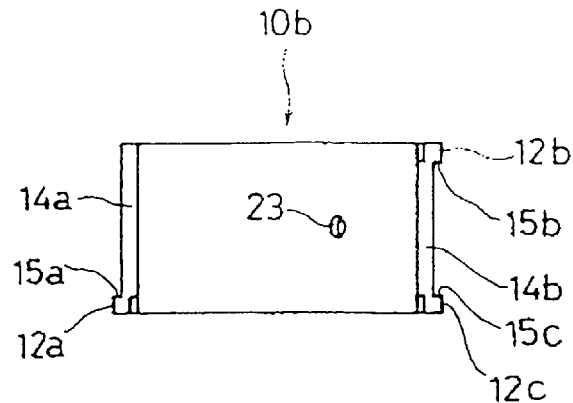
FIG. 10(b) is a bottom view of the lower bearing metal half of FIG. 10(a)
Figure 10A:
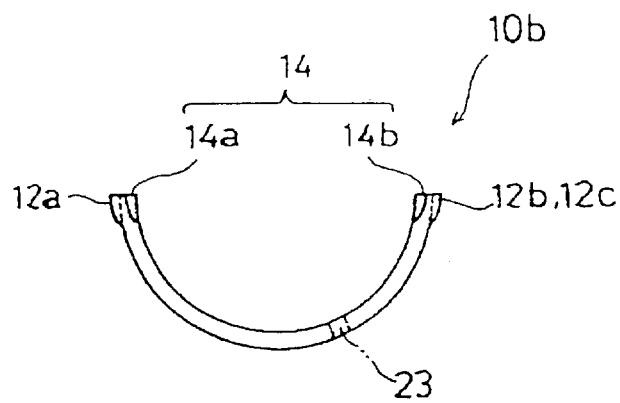
FIG. 10(a) is a side view of a lower bearing metal according to the second embodiment of the invention.
Figure 11:
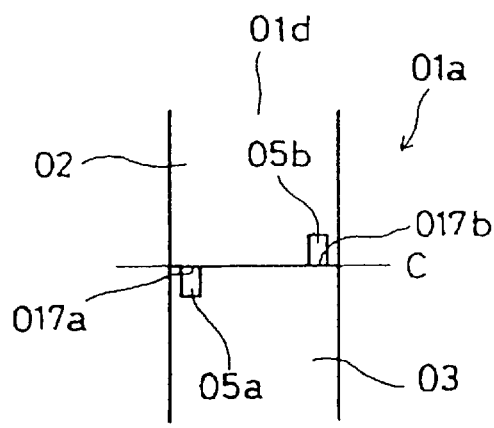
FIG. 11 is a view, similar to FIG. 2, of a related art bearing metal positioning structure.

Further, as shown in FIGS. 10(a) and 10(b), of the mating plane portions 14a and 14b located at both the peripheral edges of the upper bearing metal half 10b, the mating plane portion 14b (on the side where the oil hole 23 is provided) has a further projection 12c at an axial end (lower end in FIG. 10(b)). The projection projects radially outwardly from the axial end. A locking projection is not formed at this location in the first embodiment.

Accordingly, a pair of projections 11b and 11c are formed on the mating plane portion 13b of the upper bearing metal half 10a, and a pair of projections 12b and 12c are formed on the mating plane portion 14b of the lower bearing metal half 10b. The upper and lower bearing metal halves 10a and 10b have the same structure. In other words, by turning over a metal half used as the upper bearing metal half 10a, a metal half can be also used as the lower bearing metal half 10b. As a result, only one type of bearing metal half need be produced.

The projections 11c and 12c are respectively engaged in the locking grooves which are not used in the first embodiment, that is, in the locking groove 7a of the upper half 2, and the locking groove 6b of the lower half 3 of the large-diameter end 1a.

A locking plane 20c of the projection 11c is engaged with a locking plane 19a of the locking groove 7a. A locking plane 15c of the projection 12c is engaged with a locking plane 18b of the locking groove 6b. The bottom plane of the projection 11c is engaged with the ceiling plane of the projection 12b of the lower bearing metal half 10b. The projection 12b is engaged in the locking groove 6a, and the ceiling plane of the projection 12c is engaged with the bottom plane of the projection 11b of the upper bearing metal half 10a, which projection 11b has been engaged with the ceiling plane of the projection 12c.

The second embodiment 2 is the same as the first embodiment except for the above-described configuration, and therefore, further description thereof is omitted.

Since the engagement between the locking planes 20c and 19a, and the engagement between the locking planes 15c and 18b are added to the engagements described in the first embodiment, it is possible to further restrict the axial movement of the upper and lower bearing metal halves 10a and 10b.

Since the engagement between the bottom plane of the projection 11c and the ceiling plane of the projection 12b, and the engagement between the ceiling plane of the projection 12c and the bottom plane of the projection 11b are added to the engagements described in the first embodiment, it is possible to further restrict the peripheral movement of the upper and lower bearing metal halves 10a and 10b.

Since the bearing metal half 10a has, at both the peripheral ends, the mating plane portion 13a having one projection and the mating plane portion 13b having two projections, while the bearing metal half 10b has, at both the peripheral ends, the mating plane portion 14a having one projection and the mating plane portion 14b having two projections, it is easy for an operator to recognize whether each of the mating plane 13b (on the side where the oil hole 22 is formed) of the bearing metal half 10a and the mating plane 14b (on the side where the oil hole 23 is formed) is located on the right side or left side.

As a result, the bearing metal halves 10a and 10b can be mounted in the upper half 2 and the lower half 3 of the large-diameter end portion 1a of the split connecting rod 1, without the occurrence of assembling error, by allowing each of the oil holes 22 and 23 formed on the peripheral walls of the bearing metal halves 10a and 10b to be aligned with the oil passage 1e formed in the upper half 2 of the large-diameter end portion 1a of the split connecting rod 1.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A bearing metal and a bearing metal positioning structure for positioning the bearing metal in a large-diameter end of a split connecting rod, comprising:

a pair of substantially identical bearing metal halves, each bearing metal half having a circular arc shape traversing about 180 degrees; and locking grooves integrally die-formed with the large-diameter end of the split connecting rod; wherein each bearing metal half has two substantially flat end surfaces, the flat end surfaces of the bearing metal halves being engageable with each other so that the two halves form a substantially circular bearing metal, each bearing metal half has an axial length, at least one projection being formed on each end surface of each bearing metal half and extending radially outward from the bearing metal halves, and the at least one projection of each end surface of each bearing metal half is engageable with one of said locking grooves when the bearing metal halves are inserted into the large-diameter end of the split connecting rod.

2. The bearing metal and bearing metal positioning structure of claim 1, wherein each bearing metal half has two projections, a first projection being located at one axial end of a flat end surface, and a second projection being located on the other flat end surface at the other axial end of the bearing metal half.

3. The bearing metal and bearing metal positioning structure of claim 1, wherein each bearing metal half includes an oil hole extending radially through the half.

4. The bearing metal and bearing metal positioning structure of claim 1, wherein the large-diameter end is separated into two sections by a split plane, the flat end surfaces of the bearing metal halves engaging one another along the split plane when the bearing metal halves are inserted into the large-diameter end of the split connecting rod.

5. The bearing metal and bearing metal positioning structure of claim 4, wherein the locking grooves extend along an inner peripheral surface of the large-diameter end, the locking grooves opening to the split plane.

6. The bearing metal and bearing metal positioning structure of claim 5, wherein the large-diameter end is divided into an upper half and a lower half by the split plane, a first locking groove of the upper half being opposed to a first locking groove of the lower half across the split plane.

7. The bearing metal and bearing metal positioning structure of claim 6, wherein a second locking groove of the upper half is opposed to a second locking groove of the lower half across the split plane.

8. The bearing metal and bearing metal positioning structure of claim 4, wherein the large-diameter end is divided into an upper half and a lower half by the split plane, a groove traversing an axial extent of an inner peripheral surface of the large-diameter end and also extending along the split plane.

9. The bearing metal and bearing metal positioning structure of claim 8, wherein the upper half and the lower half of the large-diameter end include chamfered edges which extend along the axial direction of the inner peripheral surface, the chamfered edges of the upper and lower halves opposing one another when the two halves are engaged with one another, thereby forming the groove.

10. The bearing metal and bearing metal positioning structure of claim 4, wherein the large-diameter end is split into an upper half and a lower half by the split plane, one of said bearing metal halves engaging an interior surface of the upper half, and the other bearing metal half engaging an interior surface of the lower half.

11. The bearing metal and bearing metal positioning structure of claim 10, wherein the bearing metal half engaging the upper half includes three projections, a first projection being located on one flat end surface, and the remaining two projections being located on the other flat end surface.

12. The bearing metal and bearing metal positioning structure of claim 11, wherein the bearing metal half engaging the upper half includes an oil hole extending radially through the bearing metal half, the oil hole being closer to the flat end surface containing the two projections than to the flat end surface containing one projection.

13. The bearing metal and bearing metal positioning structure of claim 11, wherein the bearing metal half engaging the lower half includes three projections, a first projection being located on one flat end surface, and the remaining two projections being located on the other flat end surface.

14. The bearing metal and bearing metal positioning structure of claim 13, wherein the bearing metal half engaging the lower half includes an oil hole extending radially through the bearing metal half, the oil hole being closer to the flat end surface containing the two projections than to the flat end surface containing one projection.

* * * * *